United States Patent Office 3,221,488
Patented Dec. 7, 1965

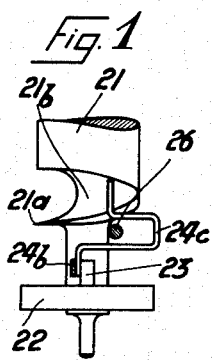
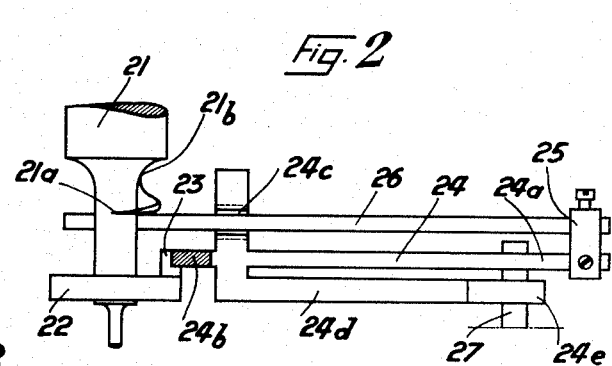
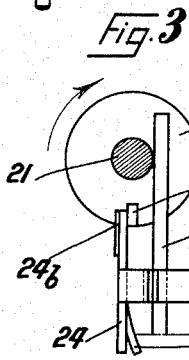
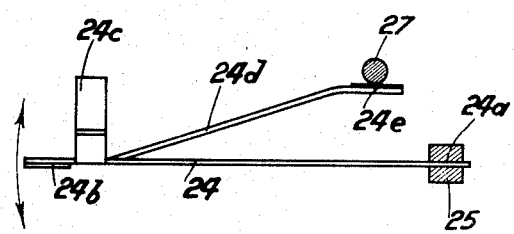
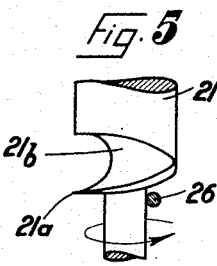
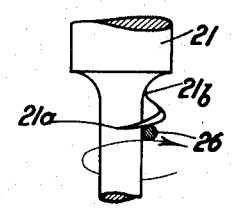
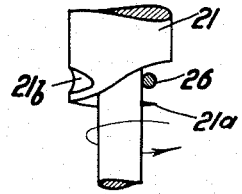
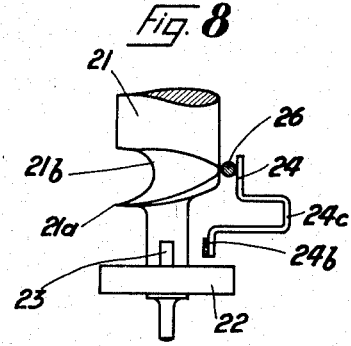
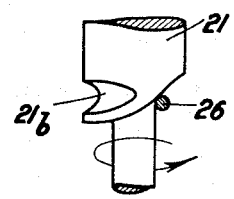

3,221,488
MICROCONTACT DEVICE FOR OSCILLATING
SYSTEMS
André Deladerriere, Saint-Nicolas-d'Aliermont, France,
assignor to Societe Anonyme Reveils Bayard, Saint-
Nicolas-d'Aliermont, France, a corporation of France
Filed June 26, 1964, Ser. No. 378,384
Claims priority, application France, July 5, 1963,
940,526
7 Claims. (Cl. 58—28)

The present invention relates to an improved microcontact device for oscillating systems, adapted to perform a specific function in sustaining an oscillating system or in moving a member along any given path at constant amplitude.

In the usual sustaining or control devices utilizing mechanically released contacts, the closing and opening functions of the electric circuit are often ill-defined. In the electric clock art, the clockworks using "contacts" for their operation show irregularities in the sustained oscillation system. These are due to irregularities in the release functions and due to the contact means proper, which, for the very low currents used, present different resistances at different times or behave in a manner similar to semi-conductors.

The present invention has for its objects, to improve the regularity of control and to provide an improved device adapted to eliminate the influence of any operating irregularities.

Such a device, applied to an electric clockwork, for example, enables the delivery of the precise amount of energy required for an oscillating system to be sustained at constant amplitude. In this specific field, a twofold advantage is thereby provided. First, the variations of the passive resistances (mechanical friction) and of energy available (voltage of the supply battery) as a function of time are automatically compensated for, thus reducing design problems. Second, constant amplitude of the regulating member, which is essential for timing, contributes greatly towards achieving constancy of operation and diminishes overbanking.

It is therefore another object of the invention to provide a control member having two distinct functions at different amplitudes of oscillation. This control function may be symmetrical or non-symmetrical relative to the rest position. The control member may be either of a mechanical, magnetic, electric or composite type, and of different constructions.

Still another subject of the invention is to provide a release member capable of rendering the rest position effective or ineffective, this function may be accomplished by apparatus of a magnetic, electric or composite nature.

The device according to the invention comprises a control member consisting of a disk integral with or fastened to the shaft of an oscillating member, for instance the balance of a clockwork—and of an helix provided on said shaft and spaced from the said disk; a release member having a contact pin fastened on said disk and acting both as a contact and as a means of operating the contact member. The contact member is a flexible strip and is connected to one of the poles of a voltage supply. The strip is adapted to contact with said contact pin fastened on said disk and is mechanically connected to the frame of the device. The frame is connected to the other pole of the voltage supply. A stop rod of non-conducting material is secured to the frame at one end, the other end rests on the shaft and is adapted to be driven upwards and outwards by the helix on said shaft if the amplitude of the oscillating system is greater than a fixed value. The rod then comes in contact with the contact strip and pushes it out of the path of the contact pin thereby preventing closing of the circuit through said strip, contact pin, shaft, frame voltage supply and actuating means.

The contact strip is bent so as to form a U-shaped half-loop, one of its ends being adapted to come into contact with the pin of the disk on the shaft of the oscillating member, said end having a bare face, closing the electric circuit when said member rotates in one direction, whereas its other face is covered by an insulating material to prevent closing of the circuit when said member rotates in the opposite direction.

The stop rod is formed of a flexible plastic material (electrically non-conducting) and is secured at one end to the plate of the apparatus, the other end rests on the shaft of the oscillating member, the said rod passes through the half-loop of the contact strip.

An embodiment of the invention is described hereinafter, reference being had to the appended drawings in which:

FIG. 1 is a diagrammatic end elevational view of the essential parts of the microcontact system in their relative positions corresponding to the closing of the electrical contact to energize the actuating means.

FIG. 2 is a side elevational view as seen in a plane perpendicular to that of FIGURE 1;

FIG. 3 is a top view of the same assembly;

FIG. 4 is a plan view of the contact strip and of its damping system;

FIG. 5–7 show three different relative positions of the parts during an operating cycle;

FIG. 8 shows the position of the parts when the contact is open during the regulation of the amplitude.

FIG. 9 shows the position of the control rod after an oscillation of large amplitude.

In the position shown in FIGURES 1 to 3 the device is described as follows:

The end of the shaft or staff 21 of a balance or of any other element performing an oscillating movement is shaped in such a way as to present a lip shaped appendix 21a as part of a helical ramp 21b.

Spaced from the helical ramp 21b hereafter called helix, is a disk 22 which is machined out of shaft 21 or secured thereto. A contact pin 23 is fastened to disk 22. A metallic flexible strip 24 rests on pin 23, the end 24a of the strip is held in a block 25 of insulating material. The block is secured to the frame of the apparatus.

Strip 24 is connected to one of the terminals of a voltage supply. End 24b is covered on one face with a friction resistant insulating varnish. The other face operates the contact and may cooperate with pin 23 connected to the frame.

The strip 24 is bent in a U-shape so as to form a half-loop 24c through which passes a flexible rod 26. On the end of the half-loop is an ear extending away from the strip. Flexible rod 26 is fastened at one end in block 25. The rod may be made of a plastic material, for instance formaldehyde. The static and dynamic friction values of formaldehydes on steel are very low and equal one to the other.

Flexible rod 26 normally bears on shaft 21 underneath helix 21b as shown in FIGURES 1 and 2.

The strip 24 (FIGS. 2 and 4) has a prong 24d which acts as a damping member and the end 24e rests against a pillar 27. To eliminate the return of current through prong 24d the pillar 27 can be of an insulating material or the end 24e of strip 24 can have a layer of insulating varnish or there can be an insulating lining on the face resting on the pillar.

The above described device operates as follows:

During an oscillation in the direction of the arrow in FIGURE 3, rod 26 in contact with shaft 21 of the balance, lies within the half-loop 24c of the contact strip 24, permitting a lateral movement of the contact strip under the action of the pin 23 which exerts a pressure on the end of said strip. The contact lasts until the pin 23 escapes from the end. At the following alternation, in the direction opposite to the arrow, pin 23 comes again in contact with the end 24b of strip 24, but on the insulated face thereof, and pushes said strip outwards without closing the electric circuit. The pin passes on the other side of the strip and the elastic strip returns to its original position.

If the amplitude of the oscillations remains relatively small, after passing the closing position of the contact, as shown at FIGURES 1 to 3, 5 and 6, the balance keeps rotating until it reaches the position represented on FIGURE 6, for instance. At this position there is a change of direction and the members revert to the position shown at FIGURE 1 as hereabove described, and an identical cycle is repeated in normal operation.

If the amplitude exceeds a predetermined limit, the balance reaches a sufficient amplitude to carry rod 26 over the lip 21a of shaft 21 as shown at FIGURE 7. When the direction of rotation is reversed, rod 26, actuated by helix 21b, moves away from the axis of shaft 21 and reaches the position shown at FIGURE 8. At this point strip 24 is pushed outwards, and its end 24b moves away from the path of pin 23, thereby avoiding the closing of the contact. At the end of the alternation rod 26 falls back to its initial position as shown at FIGURE 9.

Since no contact was made, the balance receives no impulse and the amplitude of the oscillations decreases until it reaches the value for which electrical contact is again established between pin 23 and strip 24.

By this means operation at constant amplitude is secured and the device accomplishes its purpose.

It is clear the embodiment described above is only given as an example, admitting a large number of different embodiments and that changes of forms and of particulars can be made without departing from the scope of the following claims.

We claim:

1. A microcontact device for an oscillating system comprising: a frame, an oscillating member provided with a shaft, said shaft being mounted for rotation in said frame, a control member comprising a disc and a helix spaced from said disc, both being integral with said shaft, a contact pin extending from one surface of said disc, a block of insulating material mounted on said frame, a flexible conducting strip having one end mounted in said block and another end extending into the path of said contact pin so that said contact pin will touch said end twice upon a normal cycle of oscillation, a stop rod of a non-conducting material, one end of said rod being mounted in said insulating block, the other end of said rod resting against said shaft and is adapted to be raised by said helix when the amplitude of swing of said oscillating member exceeds a predetermined limit and thus to push said strip out of the path of said contact pin during said high amplitude swing, a voltage supply source having two poles, one pole being electrically connected to said strip so that a circuit is completed when said contact strip touches said contact pin.

2. A microcontact device for an oscillating system as in claim 1 wherein the disc is fastened to the shaft.

3. A microcontact device for an oscillating system as in claim 1 wherein the shaft of said oscillating member is a clockwork balance shaft.

4. In a microcontact device as in claim 1 wherein the contact end of said flexible conducting strip is coated with insulating material on one side and bare on the other side so that when said pin strikes said strip from one side an electrical contact is made while if said pin strikes said strip from said other side no electrical contact is made.

5. A microcontact device for an oscillating system as set forth in claim 1 in which said strip has an extension just back from said other end and bent to form a U-shaped half-loop having an ear on the side of said U remote from said end and said stop rod passes through said half-loop in normal operation, but said stop rod bears against the ear of said half-loop when said stop rod has been raised by said helix and thus pushes said strip out of the path of said contact pin when the oscillation is excessive and said other end of said strip being coated on one side with insulating material and bare on the other side.

6. In a microcontact device as in claim 3 wherein the contact end of said flexible conducting strip is coated with insulating material on one side and bare on the other side so that when said pin strikes said strip from one side an electrical contact is made while if said pin strikes said strip from said other side no electrical contact is made.

7. In a microcontact device for an oscillating system as in claim 3 wherein said strip has an extension just back from said other end and bent to form a U-shaped half-loop having an ear on the side of said U remote from said end and said stop rod passes through said half-loop in normal operation, but said stop rod bears against the ear of said half-loop when said stop rod has been raised by said helix and thus pushes said strip out of the path of said contact pin when the amplitude of oscillation is excessive and said other end of said strip being coated on one side with insulating material and bare on the other side.

No references cited.

LEO SMILOW, *Primary Examiner.*